United States Patent [19]

Harada

[11] Patent Number: 5,238,078
[45] Date of Patent: Aug. 24, 1993

[54] ELECTRIC CONTROL APPARATUS FOR FOUR-WHEEL STEERING VEHICLE
[75] Inventor: Hiroshi Harada, Susono, Japan
[73] Assignee: Toyota Jidosha Kabushiki Kaisha, Toyota, Japan
[21] Appl. No.: 787,927
[22] Filed: Nov. 8, 1991
[30] Foreign Application Priority Data
  Nov. 8, 1990 [JP] Japan .................. 2-304925
[51] Int. Cl.⁵ .............................................. B62D 7/15
[52] U.S. Cl. ................................ 180/140; 364/424.05
[58] Field of Search ............ 180/140, 141, 142, 79.1, 180/79, 132; 364/424.05

[56] References Cited
FOREIGN PATENT DOCUMENTS
45971 12/1978 Japan .
204180 8/1990 Japan .

Primary Examiner—David M. Mitchell
Assistant Examiner—Andrew C. Pike
Attorney, Agent, or Firm—Cushman, Darby & Cushman

[57] ABSTRACT

For control of a four-wheel steering vehicle having a front wheel steering mechanism for a set of dirigible front road wheels and a rear wheel steering mechanism for a set of dirigible rear road wheels, a deviation of the fore-and-aft axis at the front part of the vehicle body relative to the fore-and-aft axis at the rear part of the vehicle body is detected, an optimum rear wheel steering angle is determined in consideration with the detected deviation, and a control signal indicative of the optimum rear wheel steering angle is applied to the rear wheel steering mechanism to steer the rear road wheels at the optimum rear wheel steering angle.

3 Claims, 3 Drawing Sheets

3

ELECTRIC CONTROL APPARATUS FOR FOUR-WHEEL STEERING VEHICLE

BACKGROUND OF THE INVENTION

1. Field of the Invention

The present invention relates to a four-wheel steering vehicle having a front wheel steering mechanism and a rear wheel steering mechanism, and more particularly to an electric control apparatus for the rear wheel steering mechanism.

2. Discussion of the Prior Art

In recent years, there have been developed various kinds of four-wheel steering vehicles, the rear road wheels of which are steered under control of an electric control apparatus. For example, Japanese Patent Early Publication No. 204180/1990 discloses an electric control apparatus for the four-wheel steering vehicle which is designed to detect a yaw rate of the vehicle body and a steering angle of the front road wheels for determining a steering amount of the rear road wheels in accordance with the detected yaw rate and steering angle. The detection of the yaw rate and the steering angle is conducted to control a steering amount of the rear road wheels in accordance with physical values related to a travelling condition of the vehicle. In usual automotive vehicles, however, the vehicle body is constructed to be deformed during turning travel of the vehicle. Particularly, the long body of a large size truck or bus is greatly deformed during turning travel to cause a lateral displacement between the fore-and-after axes at the front and rear parts of the vehicle body as shown in FIG. 4. As a result, the lateral axis between the rear road wheels may not be maintained in parallel with the lateral axis between the front road wheels. This results in unwanted changes in steering operation of the vehicle.

SUMMARY OF THE INVENTION

It is, therefore, a primary object of the present invention to provide an electric control apparatus for the four-wheel steering vehicle capable of eliminating such unwanted changes in steering operation of the vehicle as described above.

According to the present invention, the primary object is attained by providing an electric control apparatus for a four wheel steering vehicle having a front wheel steering mechanism for a set of dirigible front road wheels and a rear wheel steering mechanism for a set of dirigible rear road wheels, which apparatus comprises means for detecting a deviation angle of the fore-and-aft axis at the front part of vehicle body relative to the fore-and-aft axis at the rear part of the vehicle body, means for determining an optimum rear wheel steering in consideration with the detected deivation angle and for producing a control signal indicative of the optimum rear wheel steering angle, and means for applying the control signal to the rear wheel steering mechanism to steer the rear road wheels at the optimum rear wheel steering angle.

It is preferable that the means for detecting a deviation angle includes a front angular speed sensor arranged to detect an angular speed at the front part of the vehicle body, a rear angular speed sensor arranged to detect an angular speed at the rear part of the vehicle body, and means for integrating a difference between the detected angular speeds.

BRIEF DESCRIPTION OF THE DRAWINGS

Other objects, features, and advantages of the present invention will be more readily appreciated from the following detailed description of a preferred embodiment thereof when taken together with the accompanying drawings, in which.

DESCRIPTION OF THE PREFERRED EMBODIMENT

Figure 1:
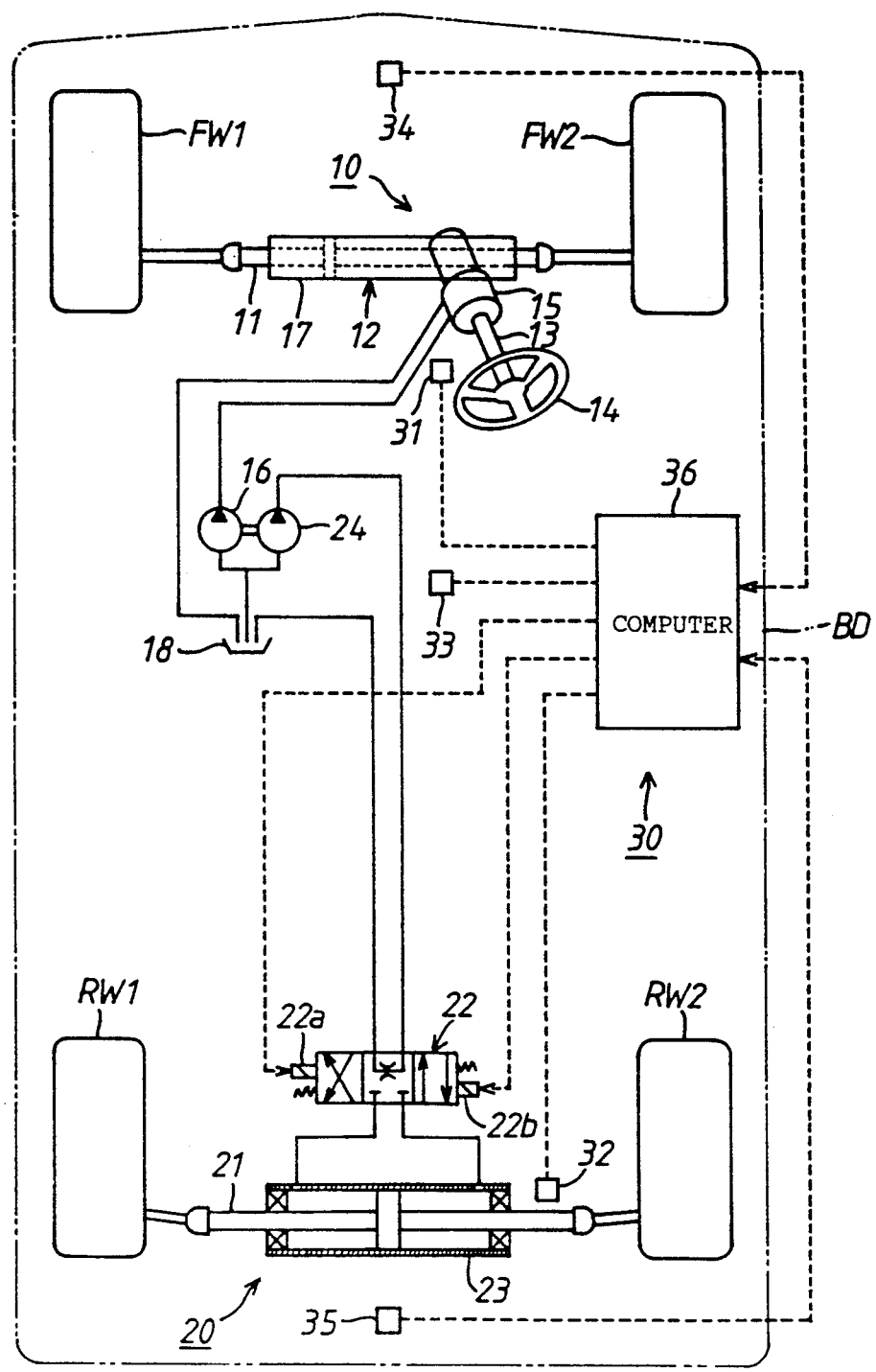
FIG. 1 is a schematic illustration of a four-wheel steering system in an automotive vehicle.

In FIG. 1 of the drawings, there is schematically illustrated a four-wheel steering system in an automotive vehicle, which includes a front wheel steering mechanism 10 for a set of dirigible front road wheels FW1, FW2, a rear wheel steering mechanism 20 for a set of dirigible rear road wheels RW1, RW2, and an electric control apparatus 30 for the rear wheel steering mechanism 20. The front wheel steering mechanism 10 includes a lateral rack bar 11 arranged to steer the front road wheels FW1, FW2. The rack bar 11 is axially movably supported by a housing 12 and operatively connected to a steering wheel 14. Assembled with a lower portion of steering shaft 13 is a mechanical changeover valve 15 which is operated by a steering effort applied thereto to supply a fluid under pressure from a hydraulic pump 18 into one of opposite fluid chambers of a power cylinder 17 within the housing 12 and to deliver the fluid discharged from the other fluid chamber of power cylinder 17 into a fluid reservoir 18. The power cylinder 17 is operated under control of the changeover valve 15 to assist axial displacement of the rack bar 11.

The rear wheel steering mechanism 20 includes a lateral relay rod 21 arranged to steer the rear road wheels RW1, RW2. The relay rod 21 is axially movably supported by a power cylinder 23 which is operated by the fluid under pressure supplied thereto from a hydraulic pump 24 under control of an electromagnetic changeover valve 22 provided with solenoids 22a and 22b. During deenergization of both the solenoids 22a and 22b, the changeover valve 22 is retained in a neutral position to interrupt the flow of fluid supplied into and discharged from the power cylinder 23 and to circular therethrough the fluid under pressure from the hydraulic pump 24 into the fluid reservoir 18. The changeover valve 23 is displaced leftward by energization of its left-hand solenoid 22a to supply the fluid under pressure from pump 24 into the left chamber of power cylinder 23 and to deliver the fluid discharged form the right chamber of power cylinder 23 into the fluid reservoir 18. When displaced rightward by energization of its right-hand solenoid 22b, the changeover valve 23 is conditioned to supply the fluid under pressure from pump 24 into the right chamber of power cylinder and to deliver the fluid discharged from the left chamber power cylinder 23 into the reservoir 18.

The electric control apparatus 30 includes a microcomputer 36 connected to a front wheel steering angle sensor S1, a rear wheel steering angle sensor 32, a vehicle speed sensor 33, and angular speed sensors 34, 35. The front wheel steering angle sensor 31 is arranged to detect a rotation angle of the steering shaft 13 for producing an electric signal indicative of a steering angle $\theta f$ of front road wheels FW1, FW2. The rear wheel steering angle sensor 32 is arranged to detect an axial displacement amount of the relay rod 21 for producing an electric signal indicative of a steering angle $\theta r$ of rear road wheels RW1, RW2. In this embodiment, the steering angles $\theta f$ and $\theta r$ each are detected as a positive value when the front and rear road wheels are steered rightward and as a negative value when the front and rear road wheels are steered leftward. The vehicle speed sensor 33 is arranged to detect a rotational number of an output shaft of the vehicle power transmission for producing an electric signal indicative of a travel speed V of the vehicle.

The angular speed sensor 34 is fixedly mounted on a front part of the vehicle body BD at the central position in a lateral direction to detect an angular speed $\gamma f$ about a vertical axis of the vehicle body for producing an electric signal indicative of the angular speed $\gamma f$. The angular speed sensor 35 is fixedly mounted to a rear part of the vehicle body BD at the central position in a lateral direction to detect an angular speed $\gamma r$ about a vertical axis of the vehicle body for producing an electric signal indicative of the angular speed $\gamma r$. The angular speeds $\gamma f$ and $\gamma r$ each are detected as a positive value when the vehicle is turned rightward and as a negative value when the vehicle is turned leftward. The microcomputer 36 includes a central processing unit or CPU, a read-only memory or ROM, a random access memory or RAM, a timer, and an interface. The CPU of computer 36 is designed to execute a control program shown by a flow chart in FIG. 2. The ROM is designed to memorize the control program and to memorize coefficients $K_1$, $K_2$, $K_3$, $\lambda_1$, and $\lambda_2$ in relation to the vehicle speed in the form of a table shown in FIG. 3.

Figure 2:
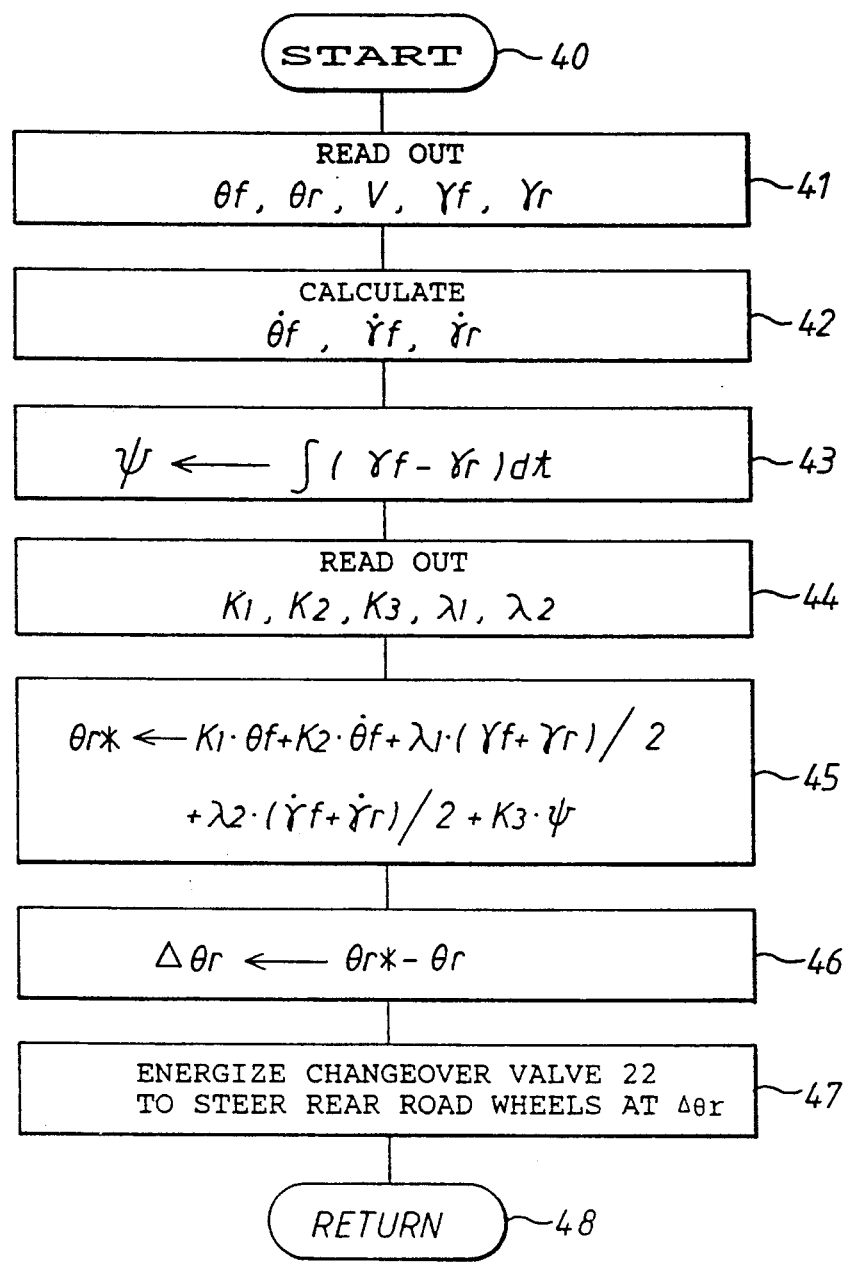
FIG. 2 is a flow chart of a control program to be executed by a microcomputer shown in FIG. 1.
Figure 3:
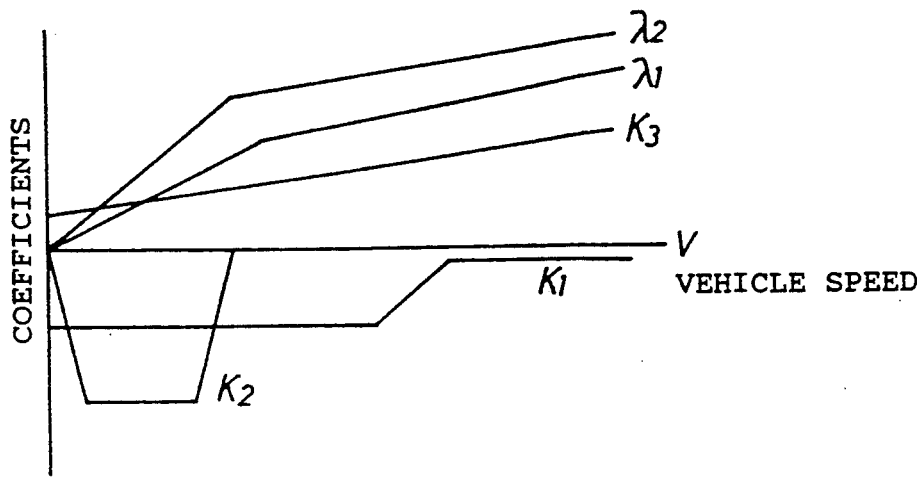
FIG. 3 is a graph showing characteristics of coefficients in relation to the vehicle speed.

Hereinafter, the operation of the electric control apparatus will be described with reference to the flow chart of FIG. 2. Assuming that an ignition switch (not shown) of the vehicle has been closed, the CPU of computer 36 initializes the RAM and the timer and starts at step 40 to execute the control program at each lapse of a predetermined time measured by the timer. At step 41 of the control program, the CPU of computer 36 reads out the front and rear wheel steering angles $\theta f$, $\theta r$, vehicle speed V, and angular speeds $\gamma f$, $\gamma r$ in response to the electric signals applied thereto from the sensors 31-35 and causes the RAM to temporarily memories them as present data. In this instance, the front wheel steering angle $\theta f$ and angular speeds $\gamma f$, $\gamma r$ previously read out at step 41 are memorized as old data n the RAM. At the following step 42, the CPU of computer 36 executes a differential calculation of the present and old data indicative of the memorized front wheel steering angle $\theta f$ and angular speeds $\gamma f$, $\gamma r$ and memorizes the differentiated values $\theta f$, $\gamma f$, $\gamma r$ of the front wheel steering angle and angular speeds in the RAM.

Figure 4:
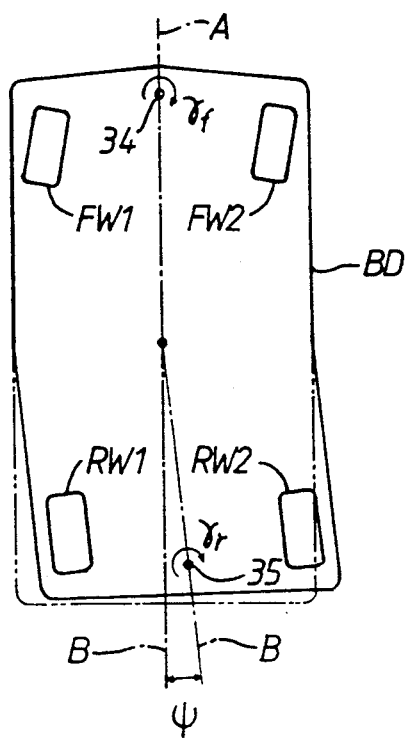
FIG. 4 schematically illustrates deformation of the vehicle body.

After processing at step 41 and 42, the CPU of computer 36 integrates, at step 43, a difference between present data of the angular speeds $\gamma f$ and $\gamma r$ to calculate an integral value $\int(\gamma f - \gamma r)dt$ after the ignition switch has been closed and to memorize the calculated differential value as a deviation angle $\psi$ of the fore-and-aft axis A at the front part of the vehicle body relative to the fore-and-aft axis B at the rear part of the vehicle body. (see FIG. 4) Assuming that the vehicle has been turned rightward or leftward during straight travel, the vehicle body is deformed as shown in FIG. 4. In this instance, the turning angle at the front part of the vehicle body becomes larger than the turning angle at the rear part of the vehicle body. As a result, the fore-and-aft axis B at the rear part of the vehicle body is deviated from the fore-and-aft axis A at the front part of the vehicle body. Such a deviation amount is calculated as the deviation angle $\psi$ described above.

At the following step 44, the CPU of computer 36 reads out respective coefficients $K_1$, $K_2$, $K_3$, $\lambda_1$ and $\lambda_2$ in relation to the vehicle speed V and calculates the following equation at step 45 to determine an optimum rear wheel steering angle $\theta r^*$.

$$\theta r^* = K_1 \cdot \dot{\theta} f + K_2 \cdot \theta f + \lambda_1 \cdot (\gamma f + \gamma r)/2 + \lambda_2 \cdot (\dot{\gamma} f + \dot{\gamma} r)/2 + K_3 \cdot \psi$$

where the value of $(\gamma f + \gamma r)/2$ corresponds with a yaw rate at the center of gravity of the vehicle body BD and the value of $(\dot{\gamma} f + \dot{\gamma} r)/2$ corresponds with a differential value of the yaw rate. Subsequently, the CPU of computer 36 calculates at step 46 a difference between the optimum rear wheel steering $\theta r^*$ and the present rear wheel steering $\theta r$ ($\Delta \theta r = \theta r^* - \theta r$) and applied at step 47 a control signal indicative of the calculated difference $\Delta \theta r$ to the electromagnetic changeover valve 22. The control program is repeated at step 48 at each lapse of a predetermined time measured by the timer.

When applied with the control signal, the changeover valve 22 is energized to control the steerage of the rear road wheels RW1 and RW2. When the calculated difference $\Delta \theta r$ is positive, the control signal is applied to the right solenoid 2b of changeover valve 22. Thus, the changeover valve 22 is displaced rightward to supply the fluid under pressure from pump 24 into the right changer of power cylinder 23 and to deliver the fluid discharged from the left chamber of power cylinder 23 into the reservoir 18. As a result, the power cylinder 23 is operated to steer the rear road wheels RW1, RW2 rightward at the optimum steering angle $\theta r^*$. When the calculated difference $\Delta \theta r$ is negative, the control signal is applied to the left solenoid 22a of changover valve 22. Thus, the changeover valve 22 is displaced leftward to supply the fluid under pressure from pump 24 into the left chamber of power cylinder 23 and to deliver the fluid discharged from the right chamber of power cylinder 23 into the reservoir 18. As a result, the power cylinder 23 id operated to steer the rear road wheels RW1, RW2 leftward at the optimum steering angle $\theta r^*$.

When the steering wheel 14 is turned rightward or leftward during low or medium speed travel of the vehicle, the coefficient $K_1$ is read out as a negative value. In this instance, the value of $K_1 \cdot \dot{\theta} f$ is calculated as a negative value (or a positive value) which causes a great influence to the optimum steering angle $\theta r^*$. As a result, the rear road wheels RW1, RW2 are steered in the opposite direction relative to the front road wheels FW1, FW2 to facilitate the turning of the vehicle at a small angle. Additionally, the value of $K_2 \cdot \theta f$ is effective to compensate a delay of response in the steering control caused by the value of $K_1 \cdot \dot{\theta} f$. If the vehicle body is applied with a yawing force when the steering wheel 14 has been turned rightward or leftward during high speed travel of the vehicle, the coefficient $\lambda_1$ is read out as a positive value. In this instance, the value $\lambda_1 \cdot (\gamma f + \gamma r)/2$ is calculated as a positive value (or a negative value) which causes a great influence to the optimum steering angle $\theta r^*$. As a result, the rear road wheels RW1, RW2 are steered in the same direction as the front road wheels FW1, FW2 to enhance the travel stability of the vehicle. Additionally, the value of $\lambda_2(\gamma f+\gamma r)/2$ is effective to compensate a delay of response in the steering control caused by the value of $\lambda_1(\gamma f+\gamma r)/2$.

Assuming that the vehicle body has been deformed during rightward or leftward turning of the vehicle as shown in FIG. 4, the turning angle at the front part of the vehicle body BD becomes larger than the turning angle at the rear part of the vehicle body BD. As a result, the fore-and-aft axis B at the rear part of the vehicle body is deviated rightward or leftward relative to the fore-and-aft axis A at the front part of the vehicle body. Thus, the steering characteristic of the vehicle tends to be an oversteer. As previously described, the deviation angle is calculated as a positive or negative value of $\psi = \int(\gamma f - \gamma r)dt$, and the coefficient $K_3$ is read out as a positive value. Accordingly, the steerage of the rear road wheels RW1, RW2 is adjusted rightward or leftward to prevent the steering characteristic of the vehicle from the oversteer tendency.

Although in the above embodiment an average value of angular speeds $\gamma f$ and $\gamma r$ has been utilized as a corresponding yaw rate of the vehicle, both the angular speeds may be weighted in a different manner to provide a different feel in steering operation of the vehicle. In addition, the coefficients $K_1$, $K_2$, $K_3$, $\lambda_1$, and $\lambda_2$ may be defined regardless of the vehicle speed.

What is claimed is:

1. An electric control apparatus for a four-wheel steering vehicle having a front wheel steering mechanism for a set of dirigible front road wheels and a rear wheel steering mechanism for a set of dirigible rear road wheels, said apparatus comprising:

means for detecting a deviation angle of a fore-and-aft axis at a front part of a vehicle body relative to a fore-and-aft axis at a rear part of the vehicle body;

means for determining an optimum rear wheel steering angle in consideration with the detected deviation angle and for producing a control signal indicative of the optimum rear wheel steering angle; and means for applying the control signal to said rear wheel steering mechanism to steer the rear road wheels at the optimum rear wheel steering angle.

2. An electric control apparatus for a four-wheel steering vehicle as claimed in claim 1, wherein said means for detecting the deviation angle includes a front angular speed sensor arranged to detect an angular speed at the front part of the vehicle body, a rear angular speed sensor arranged to detect an angular speed at the rear part of the vehicle body, and means for integrating a difference between the detected angular speeds.

3. An electric control apparatus for a four-wheel steering vehicle having a front wheel steering mechanism for a set of dirigible front road wheels and a rear wheel steering mechanism for a set of dirigible rear road wheels, said apparatus comprising:

means for detecting a steering angle of the front road wheels;

means for detecting a deviation angle of a fore-and-aft at a front part of a vehicle body relative to a fore-and-aft at a rear part of the vehicle body;

means for determining an optimum rear wheel steering angle in relation to the detected steering angle of the front road wheels in consideration with the detected deviation angle and for producing a control signal indicative of the optimum rear wheel steering angle; and means for applying the control signal to said rear wheel steering mechanism to steer the rear road wheels at the optimum rear wheel steering angle.

* * * * *